May 23, 1944. W. T. COOKE ET AL Re. 22,484
METHOD AND APPARATUS FOR LANDING AIRCRAFT
Original Filed Aug. 28, 1940
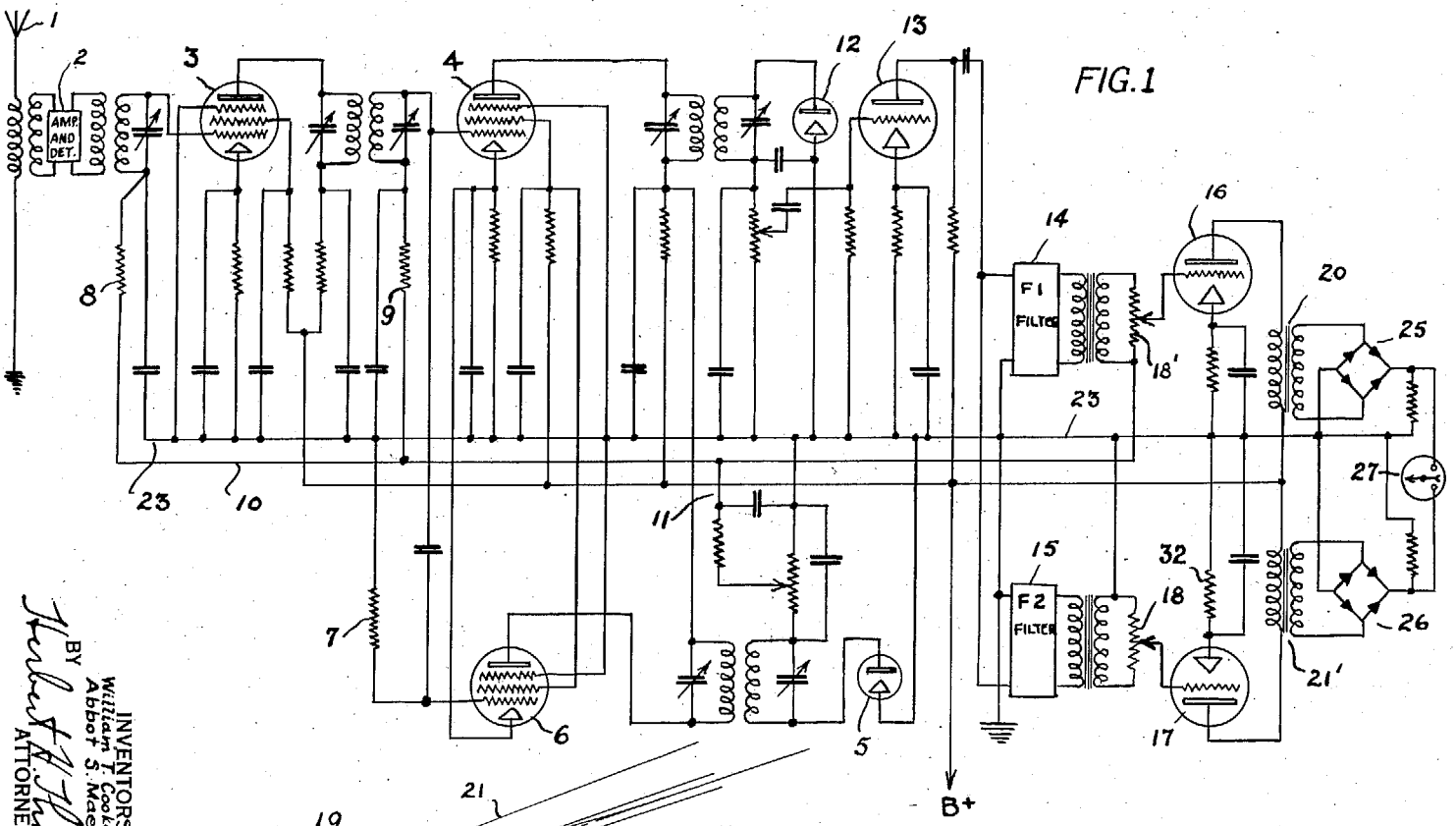
INVENTORS
William T. Cooke
Abbot S. Maeder
BY
Herbert H. Thompson
ATTORNEY Reissued May 23, 1944 Re. 22,484

UNITED STATES PATENT OFFICE 22,484

METHOD AND APPARATUS FOR LANDING AIRCRAFT

William T. Cooke, Garden City, N. Y., and Abbott S. Maeder, deceased, by Sperry Gyroscope Company, Inc., assignee, Brooklyn, N. Y., a corporation of New York Original No. 2,307,023, dated January 5, 1943, Serial No. 354,498, August 28, 1940. Application for reissue September 1, 1943, Serial No. 500,812

18 Claims. (Cl. 250—11)

This invention relates, generally, to the blind landing of aircraft, and the invention has reference, more particularly, to a novel method and means including an automatic ratio control signal receiver for use in connection with overlapping radio beams for effecting the blind landing of aircraft, the receiver serving to differentially amplify the signals of the radio beams, whereby a desired artificial guide path is obtained.

Ultra high frequency directive radio beams of the order of $10^8$ cycles per second are employed in the blind landing apparatus of this invention. The beams used, for example, may be differently modulated and provide an overlapping zone or guide path down which the aircraft flies during landing. At these high frequencies the guide path provided by the beams is substantially straight, so that if the craft follows the beam path all the way down, there is a tendency for the craft to fly into the ground. It is desirable, of course, to provide a straight guide path for the major portion of the landing operation, but just before the craft reaches the ground it is preferable to flatten or curve the glide so that the craft will land smoothly.

The principal object of the present invention is to provide a novel method and means for effecting the blind landing of aircraft which provides a substantially straight glide path for the greater part of the landing operation and with the path altered prior to landing to afford optimum landing conditions.

Another object of the present invention is to provide a novel ultra high frequency signal control receiver that serves to automatically flatten out or otherwise vary the glide path for the craft as the landing point is approached to thereby obtain optimum landing conditions, this being accomplished by automatically changing the amplification ratio of the two overlapping transmitted glide path signals at the receiver.

Other objects and advantages will become apparent from the specification, taken in connection with the accompanying drawing wherein one embodiment of the invention is illustrated.

In the drawing,

Fig. 1 is a wiring diagram of the novel receiver of this invention, and

Fig. 2 is a schematic view of the apparatus of this invention providing an artificial landing path.

Referring now to the drawing illustrating the invention, the reference numeral 1 designates a receiving antenna carried by the aircraft, which antenna feeds into an ultra high frequency radio amplifier and detector 2. In the amplifier and detector 2 the ultra high frequency modulated signals, received from the overlapping landing beams 21 and 22 (Fig. 2) that have different modulating frequencies F1 and F2, are superimposed upon a suitable carrier or locally generated frequency and then detected to produce an intermediate frequency signal which is supplied to the intermediate frequency amplifier shown as consisting of two stages 3 and 4. Automatic volume control bias is supplied to amplifier stages 3 and 4 from the AVC detector 5 which is supplied from the intermediate frequency amplifier 6 operating at a constant gain. This will be understood when it is noted that the bias on the control grid of tube 6 is determined by resistance 7 inserted between this grid and ground line 23, whereas the bias on the control grids of tubes 3 and 4 is determined by resistances 8 and 9 connected to the AVC line 10, the potential of which is determined by lead 11 connected to the filtered output of AVC detector or diode rectifier 5.

The output of the intermediate frequency amplifier 4 is detected by a second detector 12 and further amplified by a tube 13, the output of which supplies band pass filters 14 and 15, respectively, passing frequencies F1 and F2, which select the respective modulations of the two overlapping beams. The automatic volume control line 10 is also connected to the control grid of audio amplifier 16, whereby the automatic volume control bias controls the gain of this amplifier which amplifies the signal of one beam, such as that transmitted by one radiating horn or emitter 24. The audio amplifier 17 amplifies the signal supplied from filter 15, i. e., the signal of the other beam transmitted from horn or emitter 24', and this amplifier 17 operates at constant gain since the bias on its grid is determined by resistance 32 connected to the ground lead 23. The outputs of the tubes 16 and 17 are connected in opposition and pass through audio transformers 20 and 21' and through copper oxide rectifiers 25 and 26 for application to the up-down or zero center microammeter 27.

The operation of the system of this invention in providing an artificial glide path that is variable at will by varying the AVC will be understood from Fig. 2. In this figure, the overlapping beams 21 and 22 provide a glide path indicated by the dotted line 28, i. e., a straight glide path down which the craft would normally fly to earth 30. In using the novel receiver of this invention, however, and assuming it is desired to flatten out the glide path just before landing to prevent flying the craft into the ground, the detected modulation F1 of the upper beam 21 is amplified by the tube 16 having AVC bias thereon whereas the F2 signal of the lower beam 22 is amplified by tube 17 operating at constant gain. Thus, the signal of the upper beam is weakened relative to that of the lower beam and in order to fly in an equi-signal region, the pilot must alter his course as shown by the solid line 19, thereby automatically flattening his glide to provide a normal landing. Although, in the example given the effective glide path is raised as the craft approaches a landing, this path could be lowered if desired.

The glide angle, i. e., the angle between line 28 and the ground 30 may be changed, if desired, by adjusting the manual ratio potentiometer controls 18 and 18'.

In conventional operation, the craft is guided along its path defined as the equi-signal zone of the intersecting lobes or directive radiation patterns, according to the orientation of the lobes or patterns and the pointer of meter 27 is in a neutral position, indicating that the strength of the signals derived from the modulation components as applied to the meter are equal and hence have a unitary relative strength ratio.

The foregoing operation is modified, according to the present invention by unbalancing this ratio, as a function of the total received field strength, as by varying the fly-up or fly-down signals, in the case of instrument landings. This results in unequal opposed signals at the meter and causes a meter deflection that requires a displacement of the craft in a direction to restore the unitary ratio, thereby providing a new path displaced from and convergent on the original path. If the ratio is continuously and progressively unbalanced as a function of the distance of the craft from the transmitter, determined, for example, as a function of the combined lobe field strength as measured by the AVC bias, the new path becomes less convergent, parallel, or even divergent relative to the original path, according to the manner in which the signals are unbalanced. Unbalancing the respective signal strengths, as indicated, accordingly diverts the craft and alters the apparent locus of the original flight path as the craft nears the transmitter.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention what we claim and desire to secure by Letters Patent is:

1. In apparatus for landing aircraft, ultra high frequency radio projecting means in the region of the landing area producing overlapping beams of electromagnetic energy, means for modulating said beams at different frequencies, a receiver carried by the aircraft, said receiver comprising different amplifiers for amplifying the different modulations of the beams, and means controlled by the strength of the received energy for varying the amplification ratio between said different amplifiers, thereby providing a glide path that varies from a straight line as the landing area is approached.

2. In apparatus for landing aircraft, ultra high frequency radio projecting means in the region of the landing area producing overlapping beams of differently modulated electromagnetic energy, and a receiver carried by the aircraft, said receiver comprising amplifiers for amplifying the modulations of the beams, and an automatic volume control detector circuit connected for limiting the gain of an amplifier of one of said modulations, the amplifier of the other modulation operating at substantially constant gain to obtain dissimilar amplifications of said modulations and hence a glide path departing from a straight line.

3. A method of landing aircraft blind comprising, projecting overlapping beams of differently modulated ultra high frequency electromagnetic energy, receiving the beam signals on the aircraft, detecting said signals, amplifying said detected signals by different amounts, one of said signals being amplified at constant gain and the other at a variable gain dependent on the strength of such signal, rectifying said thusly amplified signals, and flying the aircraft such that the rectified signals are equal.

4. An ultra high frequency receiver for aircraft in effecting blind landings comprising, means for superimposing received ultra high frequency signals upon a locally generated frequency and for detecting said signals to produce intermediate frequency signals, an automatic volume control amplifier connected for amplifying said signals, an intermediate frequency detector connected for detecting said intermediate frequency signals, audio amplifiers connected for amplifying said detected signals, and means for varying the ratio of the gains of the audio amplifiers in accordance with the strength of the received signals, and means for indicating the difference in the relative strengths of said amplified modulations.

5. An ultra high frequency receiver for aircraft in effecting blind landings comprising, means for amplifying the received differently modulated signals, means for detecting said signals, automatic volume control means, amplifiers for amplifying said respective modulations, one of said amplifiers being controlled from said automatic volume control means so that said modulations are amplified in different ratios depending upon the strength of the received signals, rectifier means for rectifying said amplified modulations, and means for comparing the relative strengths of said rectified modulations.

6. In an apparatus for landing aircraft, ultra high frequency radio projecting means in the region of the landing area producing overlapping beams of differently modulated electromagnetic energy, means on the aircraft for receiving said differently modulated energy, means for detecting said received energy to obtain the modulations therefrom, means for separating said modulations, means for amplifying one of said modulations at constant gain and the other at varying gain depending on the strength of such modulation, and indicator means supplied with said amplified modulations in opposition.

7. In a method of guiding a craft with reference to a path defined by the equi-signal zone of a pair of overlapping lobes of directive radiation in response to equal amplitude signals derived from said respective lobes, the step comprising altering the apparent orientation of said path by unbalancing the unitary amplitude ratio of the signals derived from said respective lobes while said craft is on said path.

8. In an instrument-landing system for aircraft, a method of defining a path for said aircraft relative to an equi-signal zone formed by two overlapping directive radiation patterns, comprising providing an indication of the position of said aircraft relative to said zone, and modifying said indication as a function of the field strength of the combined radiation patterns.

9. In a method of guiding a craft with reference to a glide path defined by the equi-signal zone of a pair of overlapping lobes radiated directively from a transmitter, along which path upwardly-directing and downwardly-directing signals derived from said lobes are of equal amplitude, the steps comprising unbalancing the unitary ratio of said amplitudes progressively as a function of the field strength received from the combined lobes, and regulating the craft motion relative to said path so as to restore said ratio.

10. In a method of guiding a craft using as a reference a guide path defined by the equi-signal zone of a pair of overlapping lobes of directive radiation, the steps comprising deriving signals as a function of the relative field intensities of the respective lobes, maintaining said craft substantially on said path so as to maintain said signals of equal amplitude, progressively unbalancing the unitary ratio of said amplitudes as said craft approaches the source of said radiation in response to a predetermined function of field strength of the combined lobes, and thereupon diverting said craft from said path to restore said ratio.

11. In apparatus for landing aircraft, ultra high frequency radio projecting means in the region of the landing area producing overlapping beams of electromagnetic energy, means for modulating said beams at different frequencies, a receiver carried by the aircraft, said receiver comprising means for deriving signals from the modulation component of each of said beams, and means controlled by the strength of the received energy for varying the amplitude ratio between said respective derived signals, thereby providing a glide path that varies from a straight line as the landing area is approached.

12. An ultra high frequency receiver for aircraft in effecting instrument landings along a path defined by differently modulated intersecting radiant energy lobes, comprising means for amplifying the received differently modulated signals, means for detecting said signals, automatic volume control means, means for deriving fly-up and fly-down signals from said detected signals, means for controlling the strength of said fly-up signals relative to said fly-down signals in response to said volume control means, and means for indicating whether said signals are of equal strength.

13. In an apparatus for landing aircraft, radio frequency energy projecting means in the region of the landing area producing overlapping beams of differently modulated electromagnetic energy, means on the aircraft for receiving said differently modulated energy, means for detecting said received energy to obtain the modulations therefrom, means for separating said modulations, means for amplifying said modulations, indicator means supplied with said amplified modulations in opposition, and means responsive to the combined strength of such modulations for varying the ratio of the amplifications of said separate modulations.

14. A radio receiver for a craft following a path defined by the equi-signal plane of a pair of intersecting distinctively-modulated directive radiation patterns, comprising means for detecting the modulation component of each of said patterns, means for indicating the relative strength of said respective detected components, and means for varying said relative strength as a function of the combined field strength of said patterns.

15. A radio receiver for a craft following a path defined by the equi-signal zone of a pair of intersecting distinctively-modulated directive radiation patterns, comprising means for detecting the modulation component of each of said patterns, an automatic volume control generator( means for indicating the relative strength of said respective detected components, and means for varying said relative strength as a function of the output from said generator.

16. A radio receiver for a craft following a path defined by the equi-signal plane of a pair of intersecting distinctively-modulated directive patterns radiated from a transmitter, comprising means for detecting the modulation component of each of said patterns, means for deriving fly-up and fly-down signals therefrom, means for comparing the relative strengths of said fly-up and said fly-down signals, and means for automatically progressively varying said relative strengths as said craft approaches said transmitter.

17. An instrument landing receiver for aircraft, comprising means for deriving signals from two overlapping directive radiation patterns while said aircraft proceeds along the equi-signal zone of said patterns, a glide-path indicator energized by said signals in opposition, thereby providing a neutral indication when said signals are equal, means for deriving a potential as a function of the field strength of said combined radiation patterns, and means for applying a function of said potential to said indicator, thereby shifting said indication from said neutral indication.

18. An instrument landing receiver for aircraft, comprising means for deriving signals from two overlapping directive radiation patterns while said aircraft proceeds along the equi-signal zone of said patterns, a glide-path indicator energized by said signals in opposition, thereby providing a neutral indication when said signals are equal, and means for biasing said indicator as a function of the field strength of at least one of said radiation patterns.

WILLIAM T. COOKE.
SPERRY GYROSCOPE COMPANY, INC.,
*Assignee of the Entire Interest, on Behalf of Abbott S. Maeder, Deceased.*
By HERBERT H. THOMPSON,
*Asst. Secretary.*